US009845584B1

(12) United States Patent
Goldammer

(10) Patent No.: US 9,845,584 B1
(45) Date of Patent: Dec. 19, 2017

(54) BARRIER PANEL CONNECTING CLIP AND METHOD

(71) Applicant: Richard Christian Goldammer, Kelowna (CA)

(72) Inventor: Richard Christian Goldammer, Kelowna (CA)

( * ) Notice: Subject to any disclaimer, the term of this patent is extended or adjusted under 35 U.S.C. 154(b) by 0 days.

(21) Appl. No.: 15/242,528

(22) Filed: Aug. 21, 2016

(51) Int. Cl.
| | |
|---|---|
| *E02D 5/16* | (2006.01) |
| *E02D 5/14* | (2006.01) |
| *E02D 5/03* | (2006.01) |
| *E02D 29/02* | (2006.01) |
| *E02D 31/00* | (2006.01) |
| *B09C 1/00* | (2006.01) |
| *E02D 7/00* | (2006.01) |

(52) U.S. Cl.
CPC ............... *E02D 5/14* (2013.01); *B09C 1/00* (2013.01); *E02D 5/03* (2013.01); *E02D 7/00* (2013.01); *E02D 29/0266* (2013.01); *E02D 31/00* (2013.01)

(58) Field of Classification Search
CPC .... E02D 5/08; E02D 5/06; E02D 5/16; E02D 5/14; E02D 5/03; E02D 7/00; E02D 29/0266; E02D 31/00; E04B 1/2403; E04B 2001/2457; E04B 2001/2415; E04B 2001/2421
USPC ................ 405/274, 275, 276, 278, 279, 281
See application file for complete search history.

(56) References Cited

U.S. PATENT DOCUMENTS

| | | | | |
|---|---|---|---|---|
| 1,968,220 A | * | 7/1934 | Prielipp ................... | E02D 5/04 219/107 |
| 2,018,625 A | * | 10/1935 | Grave ....................... | E02D 5/04 405/277 |
| 2,141,107 A | * | 12/1938 | Greulich ................ | E02D 5/523 403/272 |
| 2,211,375 A | * | 8/1940 | Greulich ................ | E02D 5/523 403/271 |
| 2,708,828 A | * | 5/1955 | Pruyn ..................... | E02D 5/523 403/271 |
| 3,119,635 A | * | 1/1964 | Dealy ..................... | E02D 5/523 403/334 |
| 3,228,495 A | * | 1/1966 | Hazell ..................... | E02D 5/08 403/380 |
| 3,796,057 A | * | 3/1974 | Dougherty ............. | F16L 21/002 285/331 |

(Continued)

*Primary Examiner* — Carib Oquendo
(74) *Attorney, Agent, or Firm* — Gina M. Lupino

(57) ABSTRACT

An apparatus and method for endwise connecting subterranean barrier members is disclosed. The apparatus includes at least two barrier members with each barrier member extending between top and bottom edges. Further, each barrier member has a side first edge having a flange defining a first connector and an opposed second side edge having a channel defining a second connector. The channel is sized and shaped to receive the flange of an adjacent barrier member in slidable interconnection therein. The apparatus further include a first side panel shaped to lie against a first side of the barrier members, a second side panel shaped to lie against a second side of the barrier members and a bridging plate located between the first and second panel members so as to bridge a gap therebetween, wherein the gap has a width corresponding to a width of the first and second barrier members. The associated method is directed toward creating the apparatus.

8 Claims, 8 Drawing Sheets

(56) References Cited

U.S. PATENT DOCUMENTS

| | | | |
|---|---|---|---|
| 4,537,534 A * | 8/1985 | Marsh, Jr. | E02D 5/523 403/282 |
| 6,561,736 B1 * | 5/2003 | Doleshal | E02D 37/00 405/211 |
| 7,935,406 B2 * | 5/2011 | Heindl | E02D 5/06 405/274 |
| 2006/0120810 A1 * | 6/2006 | Cinquano | E02D 5/16 405/251 |

* cited by examiner

BARRIER PANEL CONNECTING CLIP AND METHOD

REFERENCE TO MICROFICHE APPENDIX

This application is not referenced in any microfiche appendix.

BACKGROUND OF THE INVENTION

Field of Invention

The present invention relates generally to subterranean barrier panels and in particular to a method and apparatus for endwise connecting subterranean barrier panels.

Background

In the field of geotechnical engineering it is frequently necessary to physically isolate one area in a soil formation from an adjacent area for a variety of purposes. These purposes may include providing either a temporary or a permanent retaining wall, or may be for the purpose of isolating contaminants in one of those areas of soil from the other. One known method of providing such isolation is to insert successive panels to the soil formation between the two areas so as to form a continuous barrier therebetween.

In some environments, it is frequently necessary to provide such barriers to a height above the height of the conventional sized panels. One solution to such locations is to custom order and to provide panels having heights in excess of conventional panels. It will be appreciated that such panels may be difficult to manufacture and transport to the location where they are required due to the long lengths that may be required.

In applications where steel panels are to be utilized, two successive panels may be welded endwise together to form a longer overall panel. Disadvantageously however, such welding will not be possible with the use of plastic or fiber reinforced plastic panels. Additionally, such welding of the panels along their edge is a time consuming operation required to be performed at the location which may be prone to inconsistency in the weld or may have adverse effects on the metallurgy of the steel panels.

BRIEF SUMMARY OF THE INVENTION

According to a first embodiment of the present invention there is disclosed an apparatus for endwise connecting subterranean barrier members, each barrier member extending between top and bottom edges and having a side first edge having a flange defining a first connector and an opposed second side edge having a channel defining a second connector, the channel being sized and shaped to receive the flange of an adjacent barrier member in slidable interconnection therein. The apparatus comprises a first side panel shaped to lie against a first side of the barrier members and a second side panel shaped to lie against a second side of the barrier members. The apparatus further comprises a bridging plate located between the first and second panel members so as to bridge a gap therebetween wherein the gap has a width corresponding to a width of the first and second barrier members.

The second side panel may be formed of first and second side panel members. The first and second side panel members may have side edges adapted to engage against the first and second connectors of the barrier members. The first side panel may have side edges adapted to engage against the first and second connectors of the barrier members. The bridging plate may include at least one platform extending therefrom positioned to receive the first and second connectors thereon.

According to a further embodiment of the present invention there is disclosed a method of forming a subterranean barrier comprising locating the first panel with in a soil formation, locating a bottom gap of a bridging clip on a top edge of that first panel and locating a second panel in a top gap groove of the bridging clip. The method may further comprise forming the bridging clip of the front and rear panels corresponding to an outline of the first and second panels.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION OF THE INVENTION

Figure 1:
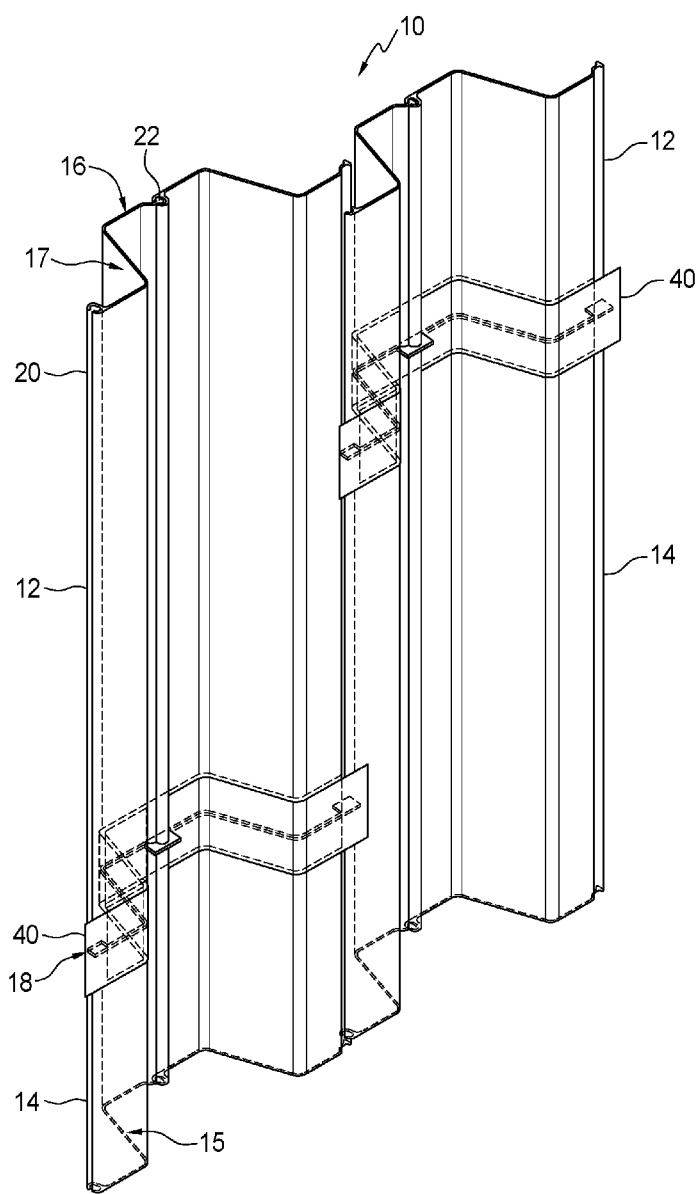
FIG. 1 is a front elevation view of a system for forming a subterranean barrier according to a first embodiment of the present invention.

Referring to FIG. 1, a subterranean wall system according to a first embodiment of the invention is shown generally at 10.

Referring to FIG. 1, a barrier wall is shown generally at 10 for use in a subterranean soil formation. The barrier wall 10 comprises a plurality of upper and lower barrier members 12 and 14, respectively inserted into the soil formation connected endwise to each other with a connector 40 therebetween. As illustrated in FIG. 1, the barrier members are adjacent to and interlocked with each other so as to form a continuous barrier wall 10 as are commonly known. The barrier wall 10 may, by way of non-limiting example be a sheet piling wall wherein the barrier members comprise impermeable sheets. Barrier members 12 and 14, such as barrier piling sheets, may be used in forming barrier walls in soil formation (not shown). Methods of inserting such barrier member are also known in the art, such as, by way of non-limiting example, by utilizing known pile driver methods such as drop hammers, vibratory hammers or plate tampers and excavators, utilizing a mandrel or digging a trench to receive the barrier members 12.

Figure 2:
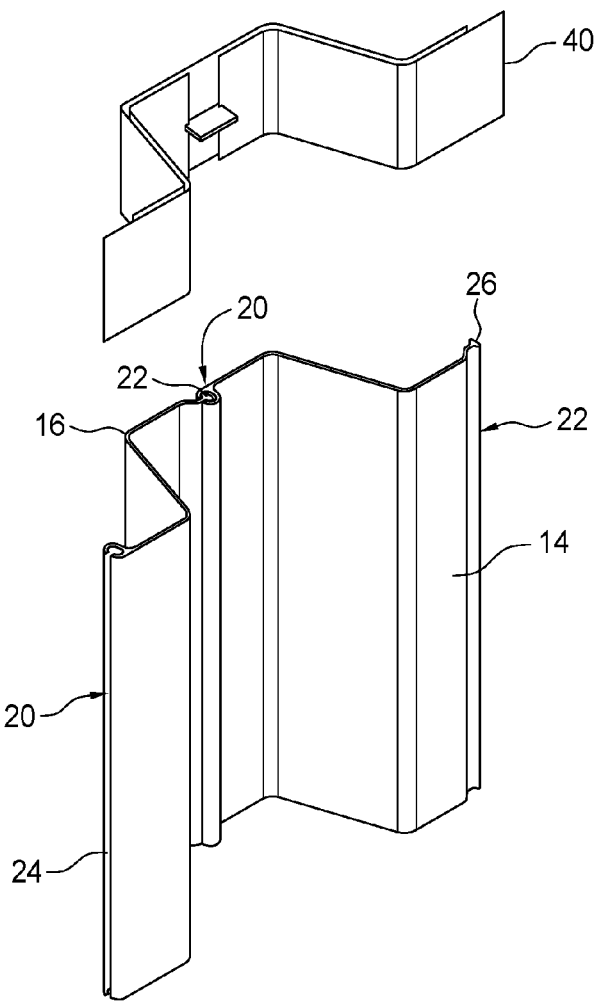
FIG. 2 is an exploded view of the system of FIG. 1 at a first stage.

Each barrier member comprises a body having a substantially rectangular outline defined by top 16, bottom 18, and first and second side edges, 20 and 22, respectively. As illustrated in FIG. 1, the barrier member 12 may comprise a sheet of material having front and rear surfaces, 15 and 17, respectively and a variety of cross section profiles as are commonly known in the art. For example, by way of non-limited example, as illustrated herein, the barrier member 12 may have a substantially z-shaped profile although it will be appreciated that other profiles may useful as well such as, a planar, a double z-shape, u-shaped or c-shaped cross section profile. As illustrated in FIG. 1, the top and bottom edges 16 and 18 are substantially parallel to each other. Furthermore, the first and second side edges 20 and 22 are substantially parallel to each other and substantially perpendicular to the top and bottom edges. With reference to FIG. 2, the first edge 18 has a first connector 24 disposed therealong while the second edge 22 has a second connector 26 disposed therealong. As further described below, the first and second connectors 24 and 26, are adapted to cooperate with corresponding first and second connectors of adjacent panels. The barrier members 12 may be formed of any known material in the art. Barrier members may be formed of metal, such as steel or aluminum, resins such as vinyl, polyvinyl chloride (PVC) or other known plastics, or composite materials such as fiberglass or carbon fiber by way of non-limiting example.

Figure 7:
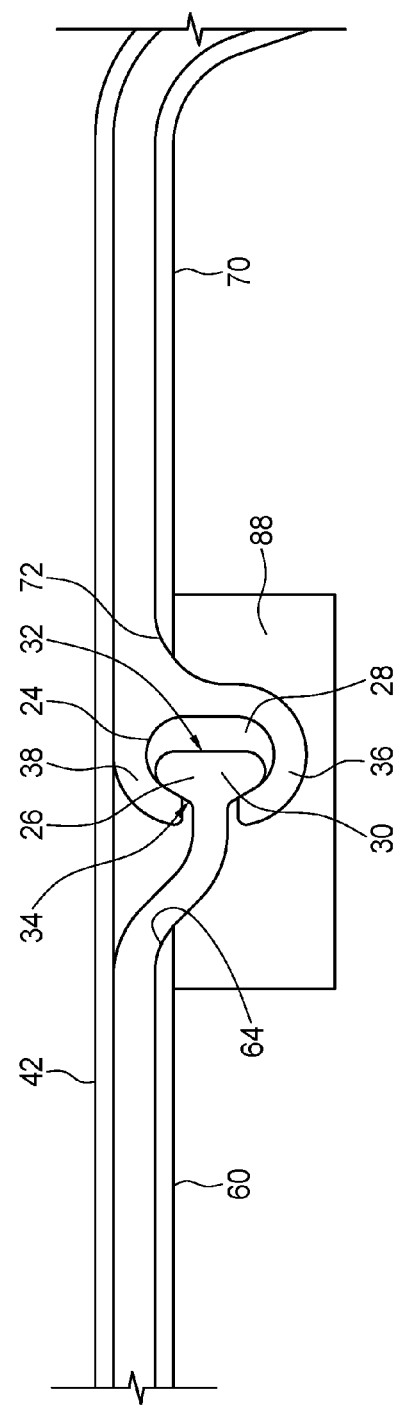
FIG. 7 is a detailed, top first connection platform of the apparatus of FIG. 4.

As illustrated in greater detail in FIG. 7, the first connector 24 of one barrier member is interlocked with the second connector 26 of an adjacent barrier member. In the embodiment illustrated in FIG. 7, the first connector 24 comprises a c-shaped channel 28 extending along the first edge 20. The second connector 26 comprises an elongate flange 30 extending along the length of the first edge 18 of the barrier member having front and rear surfaces, 32 and 34, respectively. The c-shaped channel 28 is defined by first and second opposed partitions, 36 and 38, respectively adapted to surround the flange 30 and bear against the rear surface 34 of the first connector so as to retain the flange within the c-shaped channel 28.

Figure 4:
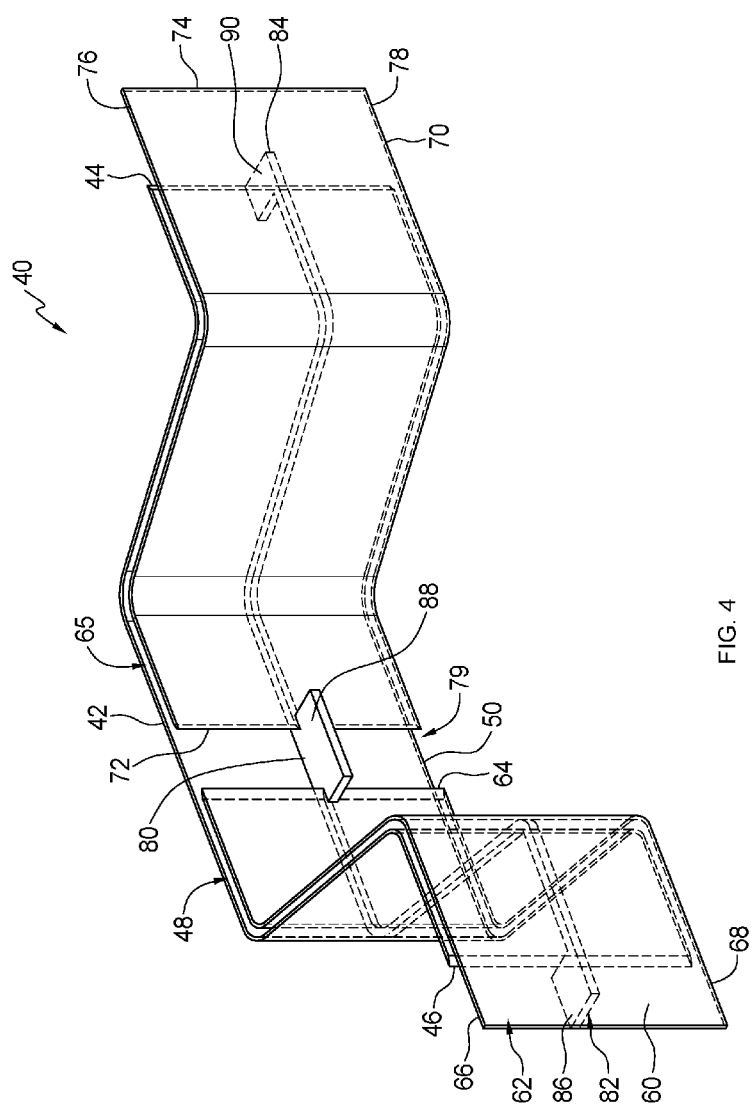
FIG. 4 is a perspective view of the apparatus for connecting top and bottom panels together or according to a first embodiment of the present invention.

Turning now to FIG. 4, a connector for endwise connecting barrier panels comprises a rear panel 42 and at least one front panel 60 and 70 forming a gap 65 therebetween. The apparatus further comprises a bridging plate 80 extending therebetween so as to maintain the gap 65 at a width corresponding to the thickness of the barrier members 12 and 14. The rear panel 42 extends between first and second side edges, respectively and top and bottom edges, 48 and 50, respectively. As illustrated, the rear panel 42 has a length between the side edges 44 and 46 corresponding to two barrier members 12 connected together and a profile shaped to match such two barrier panels. In particular, the rear panel is sized to span two barrier members with connection between such barrier members being located at a midpoint of the rear panel 42. The rear panel 42 has a height extending between top and bottom edges 48 and 50 selected provide support and stability to the barrier members 12 and 14 connected thereby. In practice, it has been found that a height of between 6 and 30 inches (152 and 762 mm) has been useful although it will be appreciated that other heights may be useful as well.

Figure 5:
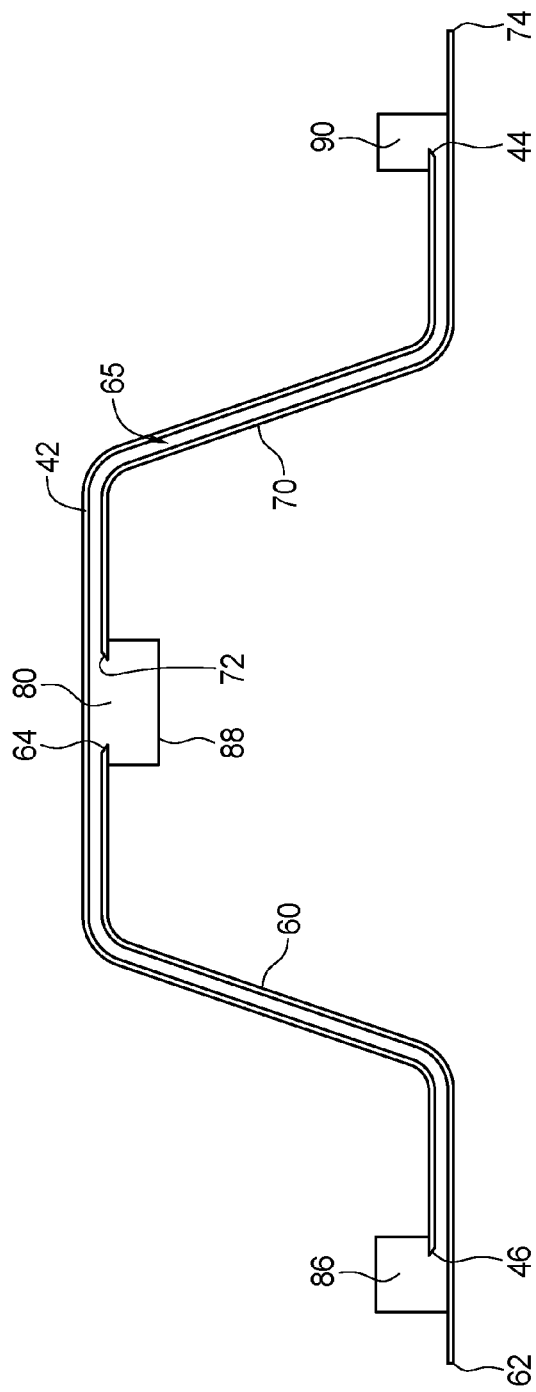
FIG. 5 is a top plan view of the apparatus of FIG. 4.
Figure 8:
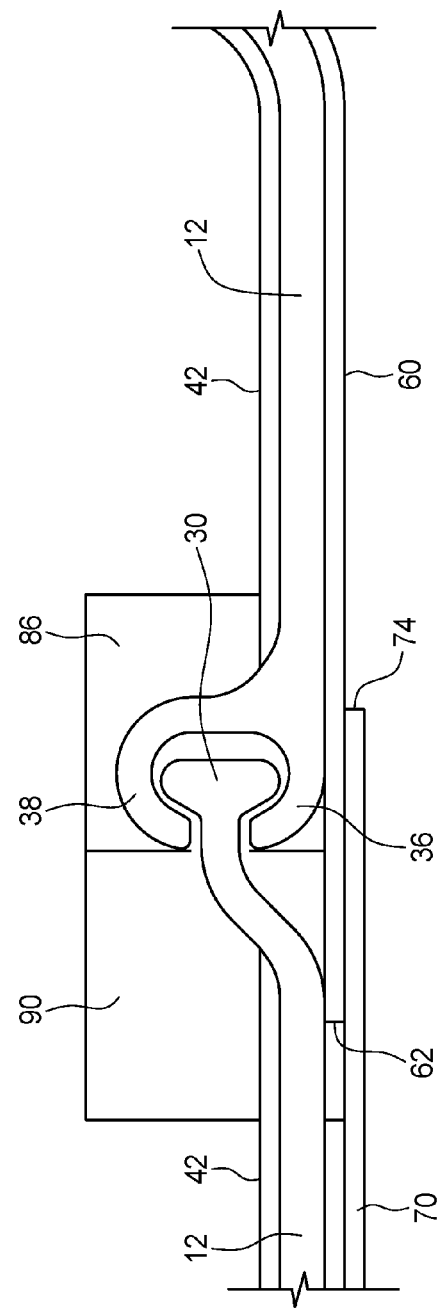
FIG. 8 is a detailed top plan view of a second connection platform of the apparatus of FIG. 4.

As illustrated in greater detail in FIGS. 5, 7, and 8, the first and second side edges 44 and 46 are profiled to match the profile of the first and second connectors 24 and 26 at those locations. As illustrated in FIGS. 7 and 8, the first and second edges 44 and 46 therefore are engaged against and form a seal with the first and second connectors 24 and 26.

The apparatus 40 may include first and second front panels, 60 and 62, respectively each being sized to correspond to a single barrier member.

Accordingly, as illustrated, two front panels are matched to a single rear panel to form a single apparatus for supporting two barrier panels. The first front panel 60 extends between first and second side edges, 62 and 64, respectively and top and bottom edges, 66 and 68, respectively. The second front panel 70 extends between first and second side edges, 72 and 64, respectively and top and bottom edges, 76 and 78, respectively. As illustrated, each front panel 60 and 70 has a length between the side edges corresponding to a single barrier member and a profile shaped to match such single barrier panels. Each front panel 60 and 70 has a height extending between top and bottom edges 66 and 68 and 76 and 78 selected to provide support and stability to the barrier members 12 and 14 connected thereby. In practice, it has been found that a height of between 6 and 30 inches (152 and 762 mm) has been useful although it will be appreciated that other heights may be useful as well.

As illustrated in greater detail in FIGS. 5, 7 and 8, the first and second side edges 62, 64, 72 and 74 are profiled to match the profile of the first and second connectors 24 and 26 at those locations. As illustrated in FIGS. 7 and 8, the first and second side edges 62, 64, 72 and 74 therefore are 20 engaged against and form a seal with the first and second connectors 24 and 26. Additionally, the first and second front panels 60 and 70 have a gap generally indicated at 79 between the second edge 64 of the first front panel 60 and the first edge 72 of the second front panel 70.

The bridging plate 80 comprises a profiled planar member having an outline corresponding to the gap 65 extending between first and second edges, 82 and 84, respectively. As illustrated, the bridging plate 80 has a length corresponding to two barrier members in common with the rear panel 42 and may include at least one platform 86, 88 and 89 at a location corresponding to a connection between the first and second connectors 24 and 26. The bridging plate 80 may be welded or otherwise adhered to the front and rear panels 60, 70 and 80 so as to form a unitary body therewith. Optionally, the birding plate 80 and front and rear panels may be co-formed as a single body through casting or the like. With reference to FIG. 7, a central platform 88 may be sized and located to receive both connectors 24 and 26 thereon so as to assist with sealing a connection between the first and second connectors 24. Furthermore, as illustrated in FIG. 8, an end connector 86 may also be sized and located to receive both connectors 24 and 26 thereon so as to assist with sealing a connection between the first and second connectors 24. As illustrated in FIG. 8, the end 62 of the front plate 60 will overlap the connector and adjacent plate by an amount sufficient to engage against the front surface of the barrier member and form a seal therewith.

Figure 3:
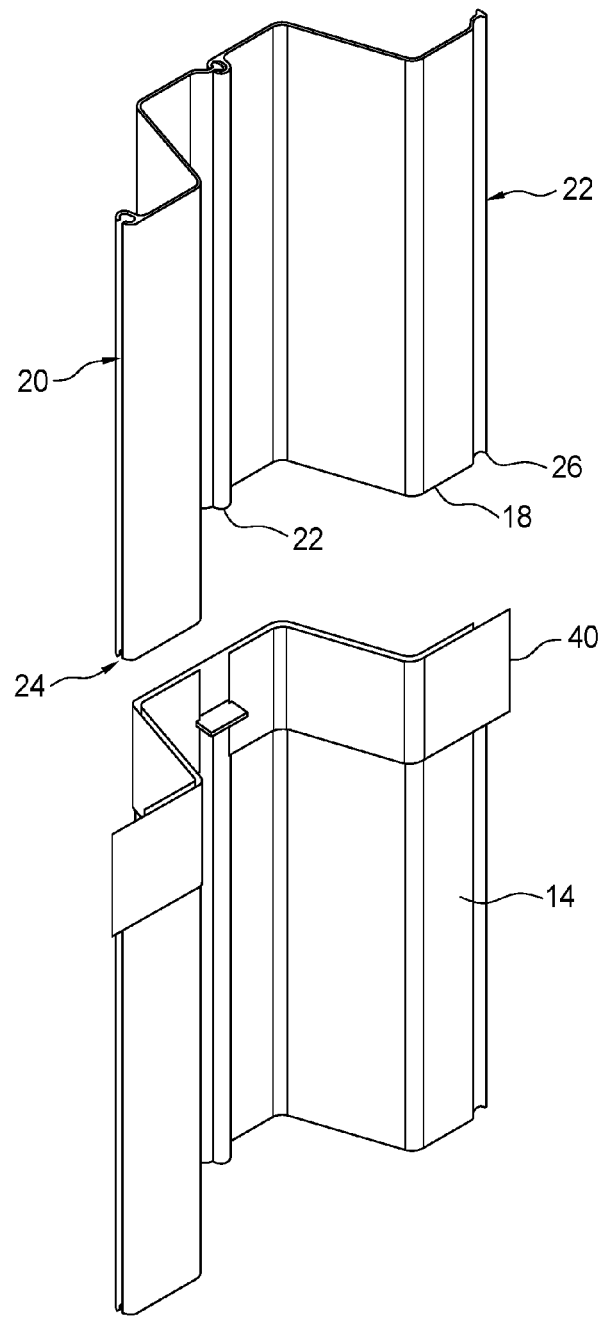
FIG. 3 is an exploded view of the system m of FIG. 1 at a second stage.
Figure 6:
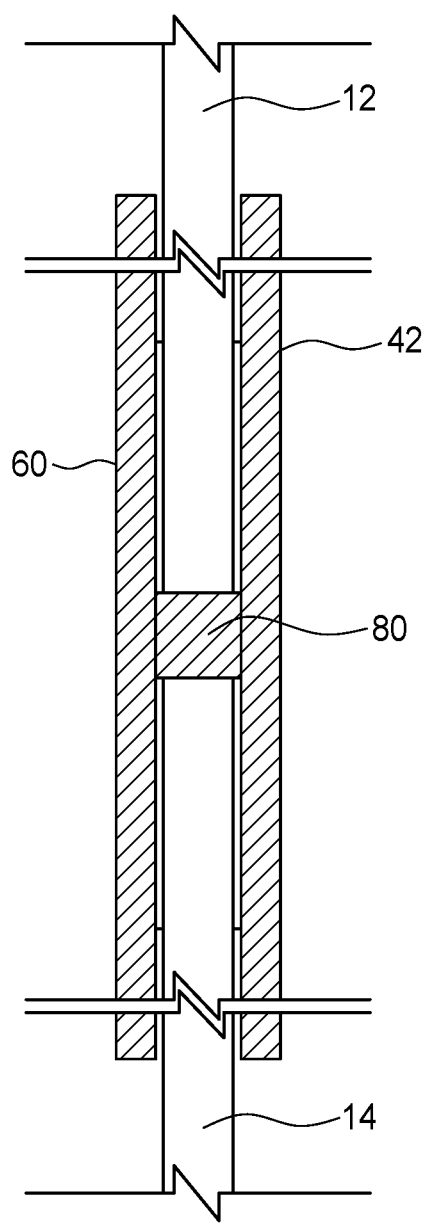
FIG. 6 is cross sectional view of the apparatus of FIG. 4 as taken along the line 6-6.

In operation, as illustrated in FIG. 2, a first pair of barrier members 14 may be located within a soil formation and an apparatus 40 thereafter located upon the top edge 16 thereof. As illustrated in FIG. 3, thereafter, a second pair of barrier members 14 may then be located upon the apparatus with the bottom edge 18 located within the gap 65 to form a connection between as illustrated in FIG. 6. As illustrated in FIG. 1, the apparatuses 40 may be vertically staggered relative to each other to provide additional strength to the overall barrier wall.

While specific embodiments of the invention have been described and illustrated, such embodiments should be considered illustrative of the invention only and not as limiting the invention as construed in accordance with the above description.

The invention claimed is:

1. An apparatus for endwise connecting subterranean barrier members, each barrier member extending between top and bottom edges and having a side first edge having a flange defining a first connector and an opposed second side edge having a channel defining a second connector, the channel being sized and shaped to receive the flange of an adjacent barrier member in slidable interconnection therein, the apparatus comprising:
   a first side panel shaped to lie against a first side of the barrier members,
   a second side panel shaped to lie against a second side of the barrier members,
   a bridging plate located between the first and second panels so as to bridge a gap therebetween, wherein the gap has a width corresponding to a width of the first and second sides of the barrier members, and
   the bridging plate includes at least one platform extending therefrom positioned to receive the first and second connectors thereon.

2. The apparatus of claim 1, wherein the second side panel is formed of first and second side panels.

3. The apparatus of claim 1, wherein the first and second side panels have side edges adapted to engage against the first and second connectors of the barrier members.

4. The apparatus of claim 1, wherein the first side panel comprises side edges adapted to engage against the first and second connectors.

5. An apparatus for endwise connecting subterranean barrier members comprising:
   at least two barrier members, each barrier member extending between first top edge, a first bottom edge and a side first edge, the side first edge comprising a flange defining a first connector and an opposed second side edge having a channel defining a second connector, the channel being sized and shaped to receive the flange of an adjacent barrier member in slidable interconnection therein,
   a first side panel shaped to lie against a first side of the barrier members,
   a second side panel shaped to lie against a second side of the barrier members,
   a bridging plate located between the first and second side panels so as to bridge a gap therebetween, wherein the gap has a width corresponding to a width of the first and second barrier members, the bridging plate including at least one platform extending therefrom positioned to receive the first and second connectors thereon.

6. The apparatus of claim 5 wherein the second edge channel is defined as a c-shaped channel adapted to surround the flange so as to retain the flange therewithin.

7. A method of forming a subterranean barrier comprising:
   placing a first side panel against a first side of a first barrier member located within a soil formation;
   placing a second side panel against a second side of a second barrier member located within the soil formation, the second side of the second barrier member being adjacent to the first side of the first barrier member;
   locating a bottom gap of a bridging clip on a top edge of the first panel, and
   placing a bridging plate between the first and second side panels so as to bridge a gap therebetween, wherein the gap has a width corresponding to a width of the first and second barrier members, and the bridging plate includes at least one platform extending therefrom.

8. The method of claim 7 further comprising forming the bridging plate to correspond to an outline of the first and second side panels.

\* \* \* \* \*